Inventors
DANIEL M. SCHWARTZ,
THEODORE N. HACKETT,
DUNCAN I. McCALLUM.

By Stowell & Stowell
Attorney

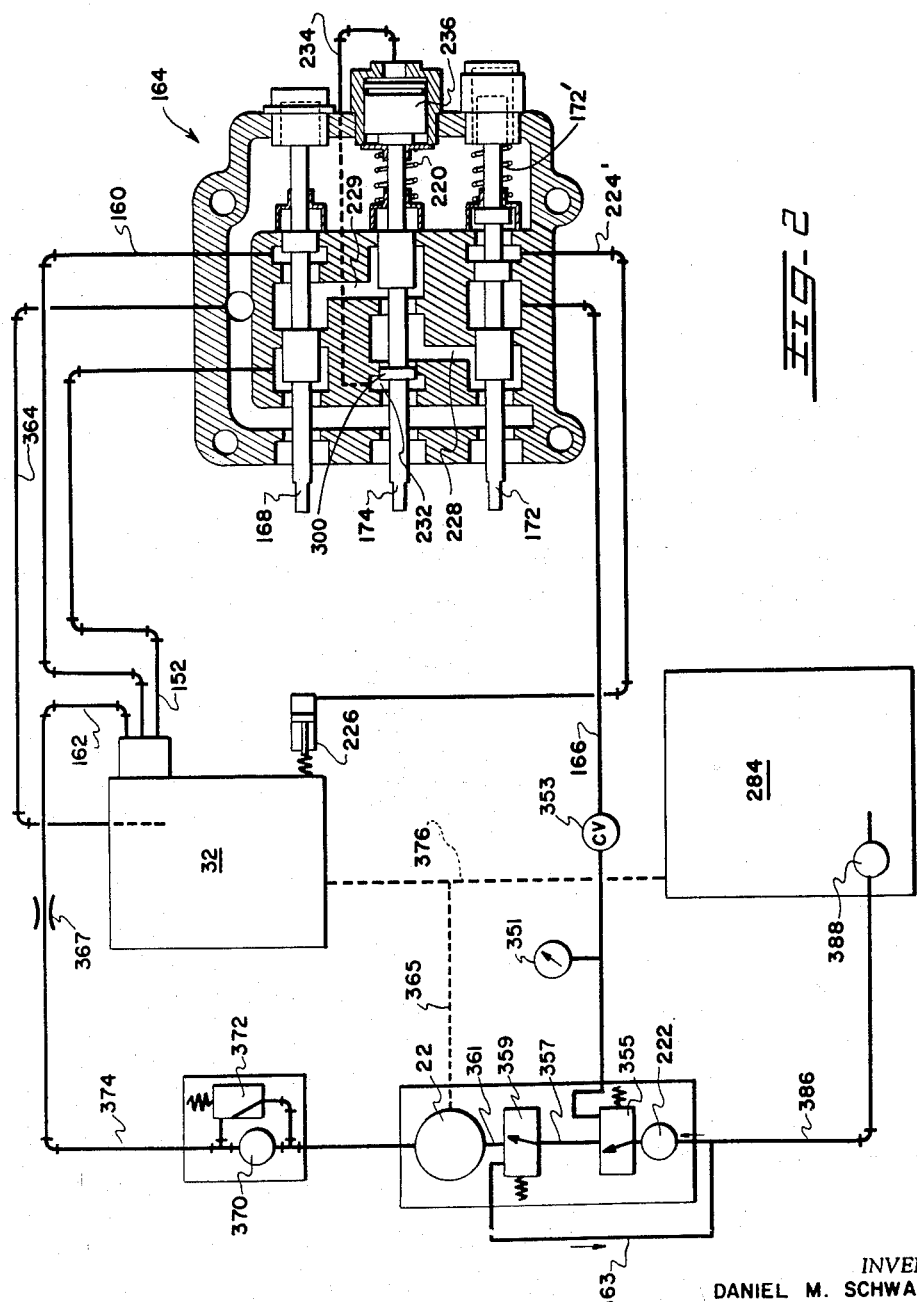

United States Patent Office 3,175,470
Patented Mar. 30, 1965

3,175,470
PRESSURE FLUID CONTROL MEANS AND SYSTEM
Daniel M. Schwartz and Theodore N. Hackett, Salt Lake City, Utah, and Duncan I. McCallum, deceased, late of Mud Lake, Idaho, by Laurette C. McCallum, administratrix, Montreal, Quebec, Canada, assignors, by mesne assignments, to The Eimco Corporation, Salt Lake City, Utah, a corporation of Delaware
Original application Mar. 7, 1962, Ser. No. 178,531, now Patent No. 3,081,890, dated Mar. 19, 1963. Divided and this application June 15, 1962, Ser. No. 210,278
7 Claims. (Cl. 91—189)

This invention relates to a pressure fluid control system and valve therefor.

An object of this invention is to provide a fluid control system and one adapted for use for a device having an overhead bucket material handling means wherein the overhead bucket mechanism is automatically disconnected from the power supply and its travel reversed and/or stopped at substantially any predetermined bucket position whereby the discharge distance of the bucket may be readily controlled.

This and other objects and advantages of the invention will appear more clearly from the detailed description in conjunction with the illustrative embodiments shown in the accompanying drawings in which:

FIG. 2 is a diagrammatic representation of the hydraulic system.

Figure 1:
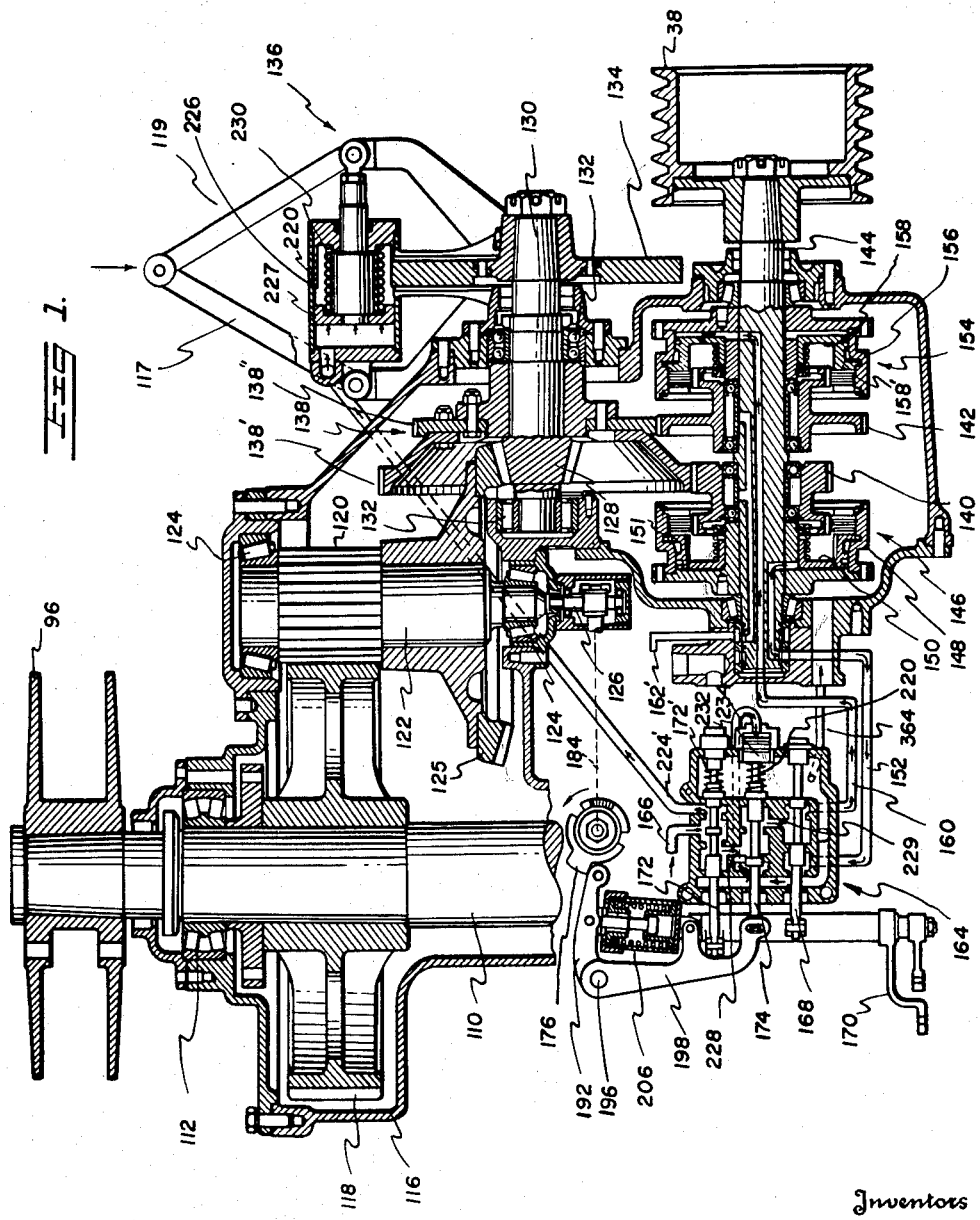
FIG. 1 is a fragmentary section of the control valve system of this invention, in combination with an overhead drive for a bucket material handling means power take-off and a clutch and brake mechanism.

Referring now to FIG. 1 of the drawings, the numeral 96 denotes one of a pair of power take-off elements adapted to actuate overhead buckets in a bucket material handling device. The take-off 96 is coupled to a shaft 110, the other end of which carries a similar power take-off member. The numeral 116 denotes a housing which encloses a gear 118, the latter being in driving connection with a smaller gear 120.

The numeral 122 denotes an intermediate shaft journalled in a bearing 124. A bevel gear 125 is rotatable with the shaft 122 and a stub shaft 126. A pinion gear 128 on a shaft 130 engages the bevel gear 125. The pinion shaft 130 is journalled in bearings 132 carried by the housing 116. Keyed to the forward end of the pinion shaft 130 is a brake disc 134 of a brake assembly generally designated by the numeral 136. A compound gear 138 having two sets of gear teeth 138' and 138" is keyed to the pinion shaft 130 between the shaft support bearing 132. Gear teeth 138' are in constant mesh with the gear teeth of gear 140 and gear teeth 138" are in constant mesh with the gear teeth of gear 142. Gears 140 and 142 are rotatably mounted on a shaft 144, the forward end of the latter being keyed to a belt drum 38. The belt drum 38 is adapted to receive power from a suitable prime mover.

Alternate radially extending clutch discs of a multiple disc clutch denoted generally by the numeral 146 are secured to and rotate with gear 140. The other discs of clutch 146 are secured to a clutch housing 148, the housing being keyed to and rotating with shaft 144. Within the clutch housing is a ring-shaped piston 150, spring urged out of engagement with the clutch discs. The rear portion 151 of piston 150 forms a presser plate for the clutch discs.

Pressure fluid is directed to the head of piston 150 through a conduit 152, a portion of which is provided by an internal passage in shaft 144. If pressure fluid in conduit 152 is directed opposite to the direction of the arrows in FIG. 1 in conduit 152, the piston 150 urges the discs of clutch 146 into engagement so that gear 140 will rotate with the clutch housing 148 which is attached to shaft 144.

Alternate radially extending clutch discs of multiple disc clutch 154 are secured to and rotate with gear 142. The other discs of clutch 154 are secured to a clutch housing 156, which housing is keyed to and rotates with shaft 144. Within the clutch housing 156 is a ring-shaped piston 158 spring urged out of engagement with the clutch discs. The rear portion 158' of the piston 158 forms a presser plate for the clutch discs.

Pressure fluid is directed to the head of the piston 158 through conduit 160, a portion of which is provided by an internal passage in the shaft 144. If pressure fluid is directed into conduit 160 in the direction of the arrows therein in FIG. 1, the piston 158 urges the discs of clutch 154 into engagement so that gear 142 will rotate with the clutch housing 156 attached to shaft 144.

A third conduit 162', a portion of which is provided by an internal passage in the shaft 144, supplies lubrication for the clutches, bearings and gears of the assembly. A pressure fluid return line 364 connects a valve 164 and the transmission housing. The lubricating oil and the pressure fluid are drained from the lowermost portion of the transmission housing by return line 376 shown in FIG. 2.

Conduits 152 and 160 are connected to a three spool pressure fluid control valve 164. The valve 164 is suitably connected to a source of pressure fluid through conduit 166.

Spool 168 of the valve 164 is the high-speed low-speed selector spool and is manually controlled by a machine operator through suitable control levers, a portion of which is shown at 170. Valve spool 172 is a three position spool having a bucket hold center position, as shown in FIG. 2, a bucket up position as shown in FIG. 1 and a bucket down position when the spool is in its most inwardly position. Valve spool 174 is a two position spool which is automatically actuated by a bucket power cut-off mechanism.

The power cut-off mechanism comprises a cam wheel 176 adjustably secured to shaft 184.

The shaft 184 is drivably connected to intermediate shaft 122 through shaft 126 by a worm gear and the worm gear keyed to a shaft 184 denoted by a dashed line in FIG. 1.

A cam arm 192, having a cam engaging roller at one end is pivotally mounted to the housing 116 by bolt 196.

A lever arm 198 is also pivotally mounted at one end to the housing by bolt 196. The lever arm 198 is bifurcated at its other end.

One end of the furcation is connected to one end of valve spool 174 by means of a slot and pin lost motion arrangement, while the other end of the furcation is pivotally mounted at the head end of a cylinder 206.

In operation of the novel bucket power cut-off mechanism, the cam wheel 176 is rotated in the direction shown by the arrow as the bucket moves from a digging to a dumping position. As the bucket approaches the dumping position, cam arm 192 is pivoted toward the cylinder 206. The initial movement of the cam arm rocks cylinder 206 and lever arm 198 to the left in FIG. 1, which moves the valve spool 174 to the left. When the spool 174 reaches its position of maximum outward travel, any further movement of cam arm 192 merely compresses a spring within cylinder 206, which results in mere lost motion.

When the shovel bucket, attached to power take-off 96, returns from the dumping position to the digging position, cam whel 176 rotates in a direction opposite to that shown by the arrow, moving the cam arm 192 away from the spool 174. With the spool 174 in its innermost position, all rearward movement of the cam arm 192 is taken up by the spring within 206.

The position of the bucket at the time the spool 174 cuts off power to the bucket elevating transmission may be varied by merely rotating the cam whel 176 relative to its mounting.

A cycle of operation of the bucket transmission will now be described.

Referring now to FIG. 2, a pump 222, driven by a prime mover, provides pressure fluid which is directed by conduit 166 to the valve 164. Conduit 166 is preferably provided with a pressure gauge 351 and a check valve 353. The check valve 353 prevents the flow of pressure fluid in line 166 toward the conventional torque converter 22 which as disclosed in U.S. Patent 2,843,213 is connected to a crawler drive mechanism. The check valve 353 thus prevents pressure fluid from being robbed from the overhead bucket transmission when the bucket is raising with a load and the crawler clutches are operated to steer the machine or to reverse the direction thereof. With the spool 172 in the position shown in FIG. 2, the bucket will not move as the ports controlled by this spool are closed. Thus no pressure fluid can flow to conduits 152 and 160 or to conduit 224' which connects the valve 164 and the brake actuating cylinder 227. The brake cylinder is spring urged into the "brake on" position and the brake is released by pressure fluid forcing the piston 227 into the brake release position against the force of spring 230 within the brake release cylinder.

When the spool 172 is manually moved outwardly from its neutral position to that position shown in FIG. 1, pressure fluid flows through conduit 224' and releases the brake 136 and a simultaneous flow of pressure fluid is directed through the internal valve passages 228 and 229. At this point the position of valve spool 168 determines if the bucket is to be raised by means of the high speed gear 142 or the low speed gear 140.

If high speed is desired, the spool 168 is moved inwardly to the position shown in FIG. 1 and pressure fluid is directed to conduit 160 and is vented from piston 150 through conduit 152 to the valve and then through conduit 364 to the gear housing. Line 376 (FIG. 2) connects a gear housing 32 to the sump 284 from which the pump 222 sucks the liquid through conduit 386 and filter 388.

If low speed is desired, the valve spool is moved outwardly from the position shown in FIG. 1 and the flow of pressure fluid in conduits 152 and 160 is reversed.

When the bucket reaches a predetermined position, the cam actuated power cut-off mechanism described above pulls valve spool 174 outwardly. When the spool 174 is in its outermost position, flow of pressure fluid through internal valve passage 229 is cut off stopping the flow of pressure fluid to the piston 150 or 158 whichever the case may be, and venting the fluid in the clutch to the sump line 364, disengaging the drive to the bucket.

In order to prevent spring 220 from immediately returning the valve spool 174 to its original position the outward movement of the spool 174 opens the passage 232 with spool land 300 moving to the left, FIG. 2, so that pressure fluid is directed through duct 234 to the head of piston 236 which holds the spool 174 in the power off position and blocks the passage 232 to the sump line 364. With the valve spool in the above described position, the bucket is free to return to the digging position by gravity.

The cam arm 192 and its cam engaging portion are also held away from cam 176, so that as the bucket returns by gravity to the digging position and the cam turns in the opposite direction to the arrow shown, plunger 174 cannot follow the cam movement and return pressure to the bucket clutch. The piston 236 holds the spool 174 out, permitting the bucket to fall freely to the digging position.

In order to permit valve spool 174 to return to the position shown in FIGS. 1 and 2, valve spool 172 is moved to its maximum inward or "bucket down" position or to the center or "bucket hold" position. With spool 172 in either of these positions, the flow of pressure fluid to the internal valve passage 229 is cut off which prevents the flow of pressure fluid through duct 234 to the head of piston 236, thus permitting spring 220 to return valve spool 174 to its normal position. The bucket may then be raised again by moving spool 174 out to the "bucket up" position.

Pump 222, besides supplying pressure fluid for the operation of the crawler and bucket transmission, also supplies pressure fluid for a tractor torque converter 22, and lubricant for the crawler and bucket transmissions.

The pressure fluid from pump 222 passes through relief valve 355 which prevents excessive pressures in the bucket transmission circuit. The relief valve supplies fluid at pressure of about 150 pounds per square inch to conduit 166 of the bucket transmission. The by-pass 357 from valve 355 supplies pressure fluid to a second relief valve 359, which supplies pressure fluid at about 70 pounds per square inch through line 361 to the torque converter 22. Fliud at any pressure in excess of 70 pounds per square inch is by-passed through line 363 to line 386 on the suction side of pump 222. A drain line 365 for the torque converter is connected to the sump line 376. The excess of pressure fluid supplied to the torque converter is filtered by filter 370, provided with a by-pass valve 372 normally set to open at a pressure of 20 pounds per square inch.

From filter 370, pressure fluid for lubrication is conducted by conduit 374 to line 162, a portion of which, as hereinbefore described, is provided by an internal passage in shaft 144 of the bucket transmission. Conduit 374 is provided with an orifice restrictor 367 to restrict the flow of lubricant to bucket transmission. An excessive flow of lubricant to the clutches of the bucket transmission has a tendency to cause a drag in the clutches resulting in a tendency to raise the bucket. With pressure at about 70 pounds per square inch, and conduit 374 having a diameter of about ¼ inch a .052 inch diameter orifice was found to maintain flow at less than ½ gallon per minute which provided very satisfactory results. The lubrication after seeping through the bearings, clutch discs and the like is conducted by sump line 376 to the reservoir 284.

From the foregoing description of the bucket transmission, it will be seen that the bucket brake mechanism is automatically applied when the bucket control spool 172 is released by the operator. The centering spring 172' returns the spool 172 to the neutral position and in this position the pressure to the bucket brake cylinder 226 is evacuated and the springs immediately apply to the brake, holding the bucket with its load. Since the bucket brake is released by fluid pressure, it has been found that it is convenient to have a manual brake release in case a hydraulic line should break or if the prime mover should fail while the bucket is in the up position. In order to accomplish the manual release of the brake, levers 117 and 119 are suitably connected to a brake release handle not shown in the drawings.

While only a preferred embodiment of the present invention has been described in detail with reference to the drawings, it will be evident to those skilled in the art that various modifications may be made in the various components of the machine as defined in the appended claims.

This application is a division of S.N. 178,531, now U.S. Patent 3,081,890. For a more complete understanding of how the elements described in this application function in a material handling device, the reader is referred to the above patent.

What is claimed is:

1. A pressure fluid control valve, a flow control spool shiftable between at least a valve open and a valve closed position and pressure fluid responsive means for selectively maintaining said flow control spool in one of the said positions, and flow directing means on said flow control spool for controlling the flow of pressure fluid to and from said pressure fluid responsive means.

2. A pressure fluid control valve, a flow control spool shiftable between at least a valve open and a valve closed position and pressure fluid responsive means for selectively maintaining said flow control spool in one of the said positions, flow directing means on said flow control spool for controlling the flow of pressure fluid to and from said pressure fluid responsive means and further valve means for controlling the flow of pressure fluid to said flow control spool.

3. A pressure fluid control system comprising first, second and third pressure fluid control valves, conduit means connecting a source pressure fluid to said first control valve, conduit means connecting said first control valve with the second control valve, conduit means connecting said second control valve with said third control valve thereby controlling the flow of pressure to said third control valve, pressure fluid responsive means for maintaining the second control valve in a preselected flow control position and flow control means on said second control valve for controlling the flow of pressure fluid to said pressure fluid responsive means.

4. A pressure fluid control system comprising first, second and third pressure fluid control valves, conduit means connecting a source of pressure fluid to said first control valve, conduit means connecting said first control valve with the second control valve, conduit means connecting said second control valve with said third control valve, conduit means connecting said third control valve with a motion device, means connecting said motion device with said second control valve for stopping the flow of pressure fluid to said third control valve, and pressure fluid responsive means for maintaining the second control valve in the flow stopping position.

5. A pressure fluid control system comprising first, second and third pressure fluid control valves, conduit means connecting a source of pressure fluid to said first control valve, conduit means connecting said first control valve with the second control valve, conduit means connecting said second control valve with said third control valve, conduit means connecting said third control valve with a motion device, means connecting said motion device with said second control valve for stopping the flow of pressure fluid to said third control valve, pressure fluid responsive means for maintaining the second control valve in the flow stopping position and flow control means on said second control valve for controlling the flow of pressure fluid to said pressure fluid responsive means.

6. A pressure fluid control system comprising first, second and third pressure fluid control valves, conduit means connecting a source of pressure fluid to said first control valve, conduit means connecting said first control valve with a first motion device and the second control valve, conduit means connecting said second control valve with said third control valve, conduit means connecting said third control valve with a second motion device, means connecting said second motion device with said second control valve for stopping the flow of pressure fluid to said third control valve, pressure fluid responsive means for maintaining the second control valve in the flow stopping position and flow control means on said second control valve for controlling the flow of pressure fluid to said pressure fluid responsive means.

7. The pressure fluid control valve of claim 1 in combination with means for actuating the said flow control spool between its valve open and valve closed positions, the action of said actuating means being dependent upon the position of a motion device controlled by said spool, and means for releasing said selectively maintaining pressure fluid responsive means from its said one position.

References Cited in the file of this patent
UNITED STATES PATENTS

| | | |
|---|---|---|
| 910,079 | Marshall | Jan. 19, 1909 |
| 2,115,414 | Davis | Apr. 26, 1938 |
| 2,264,518 | Foster | Dec. 2, 1941 |
| 2,474,187 | Olson | June 21, 1949 |
| 2,627,873 | Bothe | Feb. 10, 1953 |
| 2,689,585 | Presnell | Sept. 21, 1954 |
| 2,802,424 | Lee | Aug. 13, 1957 |
| 2,900,960 | Gratzmuller | Aug. 25, 1959 |
| 2,917,026 | Hall et al. | Dec. 15, 1959 |
| 2,948,262 | Gratzmuller | Aug. 9, 1960 |
| 2,989,077 | Lee | June 20, 1961 |

FOREIGN PATENTS

| | | |
|---|---|---|
| 160,190 | Australia | Dec. 9, 1954 |
| 98,777 | Sweden | Mar. 3, 1938 |